(12) United States Patent
Sinram

(10) Patent No.: US 9,007,398 B1
(45) Date of Patent: Apr. 14, 2015

(54) ROTATED RECTANGLE DRAWING

(71) Applicant: Google Inc., Mountain View, CA (US)

(72) Inventor: Olaf Sinram, Dublin, CA (US)

(73) Assignee: Google Inc., Mountain View, CA (US)

( * ) Notice: Subject to any disclaimer, the term of this patent is extended or adjusted under 35 U.S.C. 154(b) by 361 days.

(21) Appl. No.: 13/674,907

(22) Filed: Nov. 12, 2012

(51) Int. Cl.
*G09G 5/00* (2006.01)
*G06T 11/20* (2006.01)

(52) U.S. Cl.
CPC ..................................... *G06T 11/20* (2013.01)

(58) Field of Classification Search
None
See application file for complete search history.

(56) References Cited

U.S. PATENT DOCUMENTS

| | | | |
|---|---|---|---|
| 5,396,590 A | 3/1995 | Kreegar |
| 5,956,043 A | 9/1999 | Jensen |
| 6,346,948 B1 | 2/2002 | Evans et al. |
| 6,721,652 B1 | 4/2004 | Sanqunetti |

OTHER PUBLICATIONS

"Creating Rectangles", Vectorworks, 2009, retrieved from <http://download2.nemetschek.net/www_misc/2009/getting_started/architect/VWHelp/Vectorworks%20Fundamentals/wwhelp/wwhimpl/common/html/wwhelp.htm#href=06_2DObjects.7.31.html&single=true>.
"GIMP Rotate Tool—A Look at the Rotate Tool in GIMP", About.com Graphics Software, last viewed Nov. 7, 2012, retrieved from <http://graphicssoft.about.com/od/gimptutorials/a/rotate-tool.htm>.
"Move Tools", paint.net Documentation, 2010, retrieved from <http://www.getpaint.net/doc/latest/MoveTools.html>.
"How to Control the Axis Orientation in SketchUp", eHow Tech, last viewed Nov. 7, 2012, retrieved from <http://www.ehow.com/how_8432815_control-axis-orientation-sketchup.html>.
Murdock, "Google SketchUp and SketchUp Pro 7 Bible", 2009, pp. 479, Wiley Publishing, Inc.

*Primary Examiner* — Mark Zimmerman
*Assistant Examiner* — Vu Nguyen
(74) *Attorney, Agent, or Firm* — Dority & Manning, P.A.

(57) ABSTRACT

Methods for drawing an aligned rectangle or rotated rectangle on an electronic device are provided. In one aspect, a method includes receiving a first user input at a first location of a movable indicator in a graphical user interface includes an x-y axes, and determining whether the movable indicator has moved from the first location prior to receiving a second user input. The method also includes providing, for display, a rectangle based on coordinates of the first location and the second location and aligned to the x-y axes. The method further includes providing, for display, a first rotated rectangle, based on coordinates of the first location and a third location of the indicator, which is rotated about the x-y axes based on an angle calculated from the first location and the second location. Systems, graphical user interfaces, and machine-readable media are also provided.

20 Claims, 6 Drawing Sheets

ROTATED RECTANGLE DRAWING

BACKGROUND

1. Field

The present disclosure generally relates a display of information on an electronic device, and more particularly to graphical design on an electronic display.

2. Description of the Related Art

A common approach for creating a rectangle shape (e.g., for performing a selection of content or to draw the rectangle shape) in a graphical user interface on a computer is a click-and-drag tool that permits a user to create a rectangle shape aligned with the x-y axes of the graphical user interface. If a user seeks to create a rectangle shape that is not aligned with the x-y axes of the graphical user interface, the user takes an additional step of rotating the rectangle shape to a different x-y axes that is not aligned with the graphical user interface after the aligned rectangle shape has been created. It is often inconvenient for users to take the additional step after creating the rectangle. It is also difficult for users to adequately predict a needed size for a rectangle prior to rotating the created rectangle, with users often realizing upon rotation that their created rectangle is incorrectly sized for its intended purpose.

SUMMARY

According to one embodiment of the present disclosure, a computer-implemented method for drawing an aligned rectangle or rotated rectangle on an electronic device is provided. The method includes receiving a first user input at a first location of a movable indicator in a graphical user interface includes an x-y axes, and determining whether the movable indicator has moved from the first location prior to receiving a second user input. The method also includes providing, for display, a rectangle based on coordinates of the first location and the second location and aligned to the x-y axes when the determination indicates that the indicator has moved from the first location to a second location prior to receiving the second user input. The method further includes providing, for display, a first rotated rectangle, based on coordinates of the first location and a third location of the indicator, which is rotated about the x-y axes based on an angle calculated from the first location and the second location when the determination indicates that the indicator has remained at or substantially near the first location when receiving the second user input and prior to the indicator moving from the first location to the second location.

According to another embodiment of the present disclosure, a system for drawing an aligned rectangle or rotated rectangle on an electronic device is provided. The system includes a memory that includes instructions, and a processor. The processor is configured to execute the instructions to receive a first user input at a first location of a movable indicator in a graphical user interface includes an x-y axes, and determine whether the movable indicator has moved from the first location prior to receiving a second user input. The processor is also configured to execute the instructions to provide, for display, a rectangle based on coordinates of the first location and the second location and aligned to the x-y axes when the determination indicates that the indicator has moved from the first location to a second location prior to receiving the second user input. The processor is further configured to execute the instructions to provide, for display, a first rotated rectangle, based on coordinates of the first location and a third location of the indicator when the determination indicates that the indicator has remained at or substantially near the first location when receiving the second user input and prior to the indicator moving from the first location to the second location. A third input is received at the third location, and the first rotated rectangle is rotated about the x-y axes based on an angle calculated from the first location and the second location.

According to a further embodiment of the present disclosure, a machine-readable storage medium includes machine-readable instructions for causing a processor to execute a method for drawing an aligned rectangle or rotated rectangle on an electronic device is provided. The method includes receiving a first user input at a first location of a movable indicator in a graphical user interface includes an x-y axes, and determining whether the movable indicator has moved from the first location prior to receiving a second user input. The method also includes providing, for display, a rectangle based on coordinates of the first location and the second location and aligned to the x-y axes when the determination indicates that the indicator has moved from the first location to a second location prior to receiving the second user input. When the determination indicates that the indicator has remained at or substantially near the first location when receiving the second user input, then the method further includes providing, for display, a first rotated rectangle, based on coordinates of the first location and a third location of the indicator, which is rotated about the x-y axes based on an angle calculated from the first location and the second location, and receiving a fourth user input at a fourth location of the indicator, and providing, for display, a second rotated rectangle, based on coordinates of the first location and a fourth location of the indicator, which is rotated about the x-y axes based on the angle calculated from the first location and second location. A third input is received at the third location, and the first user input and the third user input include pointing device-down actions, and the second user input and the fourth user input include pointing device-up actions.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed interface provides a user with an ability to create a rotated rectangle shape with minimal user input. Specifically, to draw a rectangle, a user signals a mouse-down action at a first location (x0, y0). If the user signals a mouse-move after signaling the mouse-down action at the first location and prior to the mouse-up action (e.g., the user drags the mouse), it is determined that the user seeks to draw an aligned rectangle (e.g., a rectangle having an x-y axes aligned with the graphical user interface). If, however, the user signals a mouse-up action at or very near to the first location, the axis of the rectangle to be drawn is determined to be un-aligned (e.g., a "rotated rectangle").

For drawing an aligned rectangle, the user can move the mouse location to any second location (xt, yt) while maintaining the mouse-down action (e.g., by "dragging" the mouse), and a rectangle with coordinates at (x0, y0, xt, yt) will be drawn. The entire process takes one mouse click action (e.g., mouse-down and mouse-up action) to draw an aligned rectangle.

For drawing a rotated rectangle, the user can move the mouse location to any second location (xa, ya) for the second location to serve as an anchor. When the user signals a mouse-down action at the second location, an angle a of the rotated rectangle is determined from the coordinates (x0, y0, xa, ya), and the rectangle is rotated a degrees. If the user thereafter signals a mouse-up action at or very near to the second location (xa, ya), a rectangle having zero height (i.e., a line) with coordinates (x0, y0, xa, ya) that is rotated a degrees will be drawn. If the user signals a mouse-move after signaling the mouse-down action at the second location (xa, ya) and prior to the mouse-up action, the user can move the mouse location to any third location (xb, yb) while maintaining the mouse-down action (e.g., by "dragging" the mouse), and a rectangle with coordinates at (x0, y0, xb, yb, xc, yc, xd, yd) that is rotated d degrees will be drawn, with coordinate points (xc, yc) and (xd, yd) being determined from previously identified coordinate points (x0, y0) and (xb, yb) and angle d. The entire process takes two mouse click actions (e.g., two mouse-down and mouse-up actions) to draw a rotated rectangle.

Figure 1:
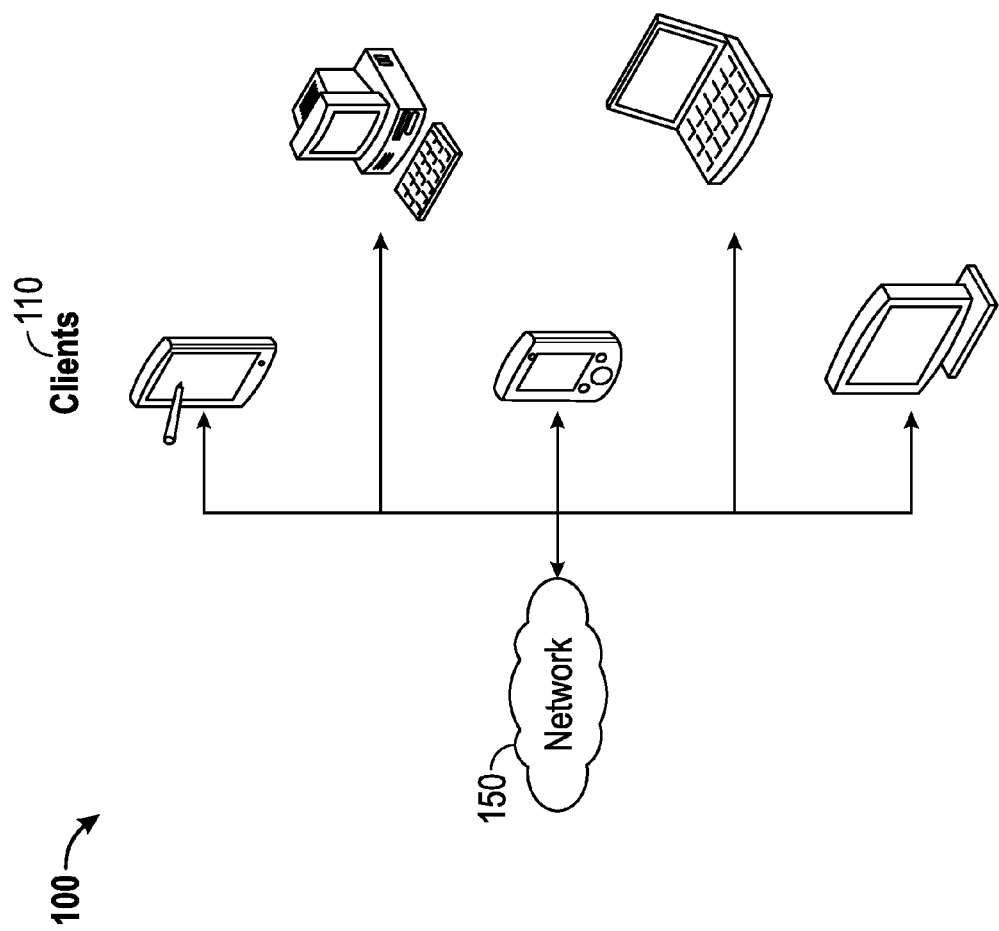
FIG. 1 illustrates an example architecture for drawing an aligned rectangle or rotated rectangle on an electronic device.

FIG. 1 illustrates an example architecture 100 for drawing an aligned rectangle or rotated rectangle on an electronic device. The architecture 100 includes clients 110 that can be connected to a network 150.

The disclosed graphical user interface system is configured to run on each of the clients 110. The graphical user interface receives an input request on a client 110 to draw a rectangle and then proceeds to draw either an aligned rectangle (i.e., aligned with the x-y axes of the graphical user interface of the client 110) or a rotated rectangle (i.e., not aligned with the x-y axes of the graphical user interface of the client 110) based on provided input. In certain aspects where the input device is a mouse, touchscreen, or keyboard, an aligned rectangle can be drawn using one touch, click, or key press, and a rotated rectangle can be drawn using two touches, clicks, or key presses. The graphical user interface is configured to permit a user of the client 110 to determine while drawing the rectangle whether the user wishes to draw an aligned rectangle or rotated rectangle.

The clients 110 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. Each client 110 can be connected to the network 150. For example, a client 110 can be connected to the network 150 in order to initially download the disclosed graphical user interface system from one or many servers (not illustrated). The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
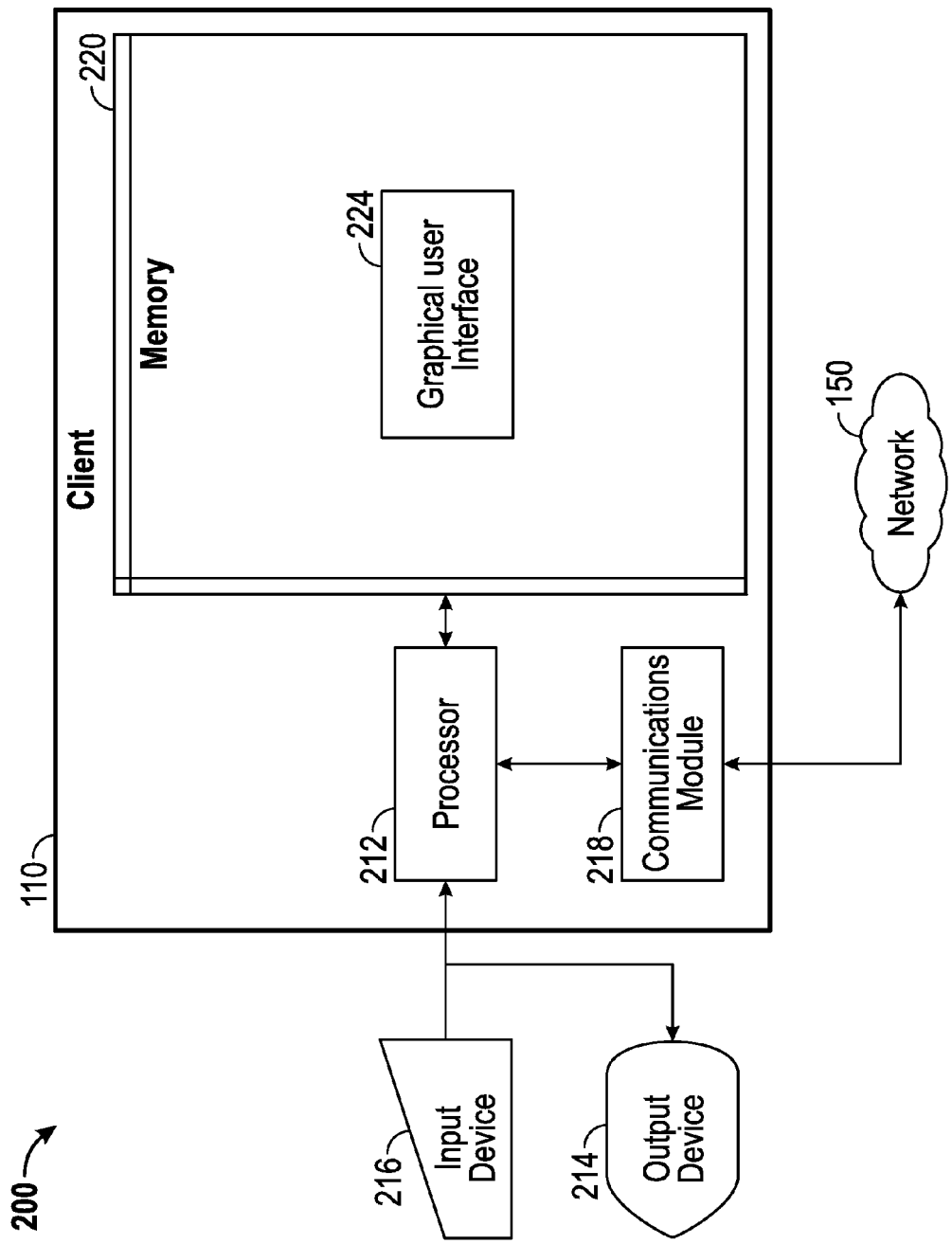
FIG. 2 is a block diagram illustrating the example client from the architecture of FIG. 1 according to certain aspects of the disclosure.

FIG. 2 is a block diagram 200 illustrating an example client 110 in the architecture 100 of FIG. 1 according to certain aspects of the disclosure. The client 110 can be connected to the network 150 via a communications module 218. The communications module 218 is configured to interface with the network 150 to send and receive information, such as data, requests, responses, and commands to other devices on the network. The communications module 218 can be, for example, a modem or Ethernet card.

The client 110 includes a processor 212, the communications module 218, and the memory 220 that includes the graphical user interface 224. The client 110 also includes an input device 216, such as a keyboard, mouse, or touch input, and an output device 214, such as a display. An input device 216 such as a keyboard or mouse can provide a pointing device-down action (e.g., pressing a button on a mouse or a key on a keyboard), pointing device-hold action (e.g., holding a button on a mouse or a key on a keyboard in a pressed state), point device-up action (e.g., releasing a pressed button on a mouse or a pressed key on a keyboard), and drag action (e.g., holding a button on a mouse or a key on a keyboard in a pressed state while moving the mouse or other indicator of a position for a movable indicator on the output device 214). An input device 216 such as a touch input device (e.g., touchscreen) can provide a touch action (e.g., touching a touchscreen with a finger), hold action (e.g., holding a finger to a touchscreen already touched by the finger), touch-and-hold action (e.g., touching and holding a finger to the touchscreen), release action (e.g., raising a finger from touching the touchscreen) touch-and-release action (e.g., touching and then raising a finger from the touchscreen), and drag action (e.g., touching and holding a finger to the touchscreen while moving the finger across the touchscreen).

The processor 212 of the client 110 is configured to execute instructions, such as instructions physically coded into the processor 212, instructions received from software in memory 240, or a combination of both. For example, the processor 212 of the client 110 executes instructions to draw an aligned rectangle or rotated rectangle on the client 110. Specifically, the processor 212 of the client 110 executes instructions from the graphical user interface 224 causing the processor 212 to receive a first user input at a first location of a movable indicator (e.g., a cursor) in the graphical user interface 224 (e.g., at a first location displayed by the graphical user interface 224 on the output device 214). The graphical user interface 224 is displayed on the output device 214 along an x-y axes. The processor 212 of the client 110 also executes instructions to determine whether the movable indicator has moved from the first location prior to receiving a second user input.

When the determination indicates that the indicator has moved from the first location to a second location prior to receiving the second user input, the processor 212 is configured to provide, for display, a rectangle based on coordinates of the first location and the second location and aligned to the x-y axes (an "aligned rectangle"). For example, the four points of the aligned rectangle can be: (1) a first point at the first location, (2) a second point at one of two positions where lines from the first location and the second location would intersect at a perpendicular angle, (3) a third point at the second location, and (4) a fourth point at the remaining position where lines from the first location and the second location would intersect at a perpendicular angle.

When the determination indicates that the indicator has remained at or substantially near the first location when receiving the second user input, the processor 212 is configured to provide, for display, a first rotated rectangle. The first rotated rectangle is based on coordinates of the first location and a third location of the indicator, the third location being identified by a third user input. The first rotated rectangle is rotated about the x-y axes a degrees based on an angle relative to the x-axis as calculated from the first location and the second location. For example, the four points of the rotated rectangle can be: (1) a first point at the first location, (2) a second point at a position where a line from the first location angled at a degrees relative to the x-axis and a line from the third location would intersect at a perpendicular angle, (3) a third point at the third location, and (4) a fourth point at a position where a line from the first location angled at 90-a degrees relative to the x-axis and a line from the third location would intersect at a perpendicular angle.

In certain aspects, the processor 212 of the client 110 is configured to receive a fourth user input at a fourth location of the indicator, and provide, for display, a second rotated rectangle, based on coordinates of the first location and a fourth location of the indicator, which is rotated about the x-y axes based on the angle calculated from the first location and the third location. For example, the four points of the second rotated rectangle can be: (1) a first point at the first location, (2) a second point at a position where a line from the first location angled at a degrees relative to the x-axis and a line from the fourth location would intersect at a perpendicular angle, (3) a third point at the fourth location, and (4) a fourth point at a position where a line from the first location angled at 90-a degrees relative to the x-axis and a line from the fourth location would intersect at a perpendicular angle.

The second rotated rectangle can appear on the output device 214 in place of the first rotated rectangle, which would not appear on the output device 214. In certain aspects, the second rotated rectangle appears on the output device 214 along with the first rotated rectangle. In certain aspects, each of the first rotated rectangle and the second rotated rectangle can be provided for display overlaid onto existing content for display. For example, if the graphical user interface 224 is configured to display a map using the output device 214, then the first rotated rectangle, the second rotated rectangle, or both the first rotated rectangle and the second rotated rectangle can be provided for display overlaid onto the map.

The user inputs can be from various devices. For example, for input devices 216 that are button based pointing devices, such as keyboard and mice, the user inputs can be key presses or mouse clicks, respectively. The first user input and the third user input can include pointing device-down actions, and the second user input and the fourth user input can include pointing device-up actions. A drag input for the keyboard or mouse can occur between the third user input and the fourth user input. Alternatively, each of the first user input, the second user input, the third user input, and the fourth user input can include pointing device-up and pointing device-down actions (e.g., individual mouse clicks).

For input devices 216 that are touch based input devices, such as a touch screen, the user inputs can be touches. The first user input can include a touch action, the second user input can include a touch-release action, the third user input can include a touch-and-hold action, and the fourth user input comprises a touch-release action. For example, for the first user input, the user can press the touchscreen with a finger in order to begin drawing a rectangle, and for the second user input the user can remove the finger from the touchscreen. For the third user input, the user can touch and hold the touchscreen, and for the fourth user input, the user can remove the finger from the touchscreen. A drag input for the touch based input device can occur between the third user input and the fourth user input.

Figure 3:
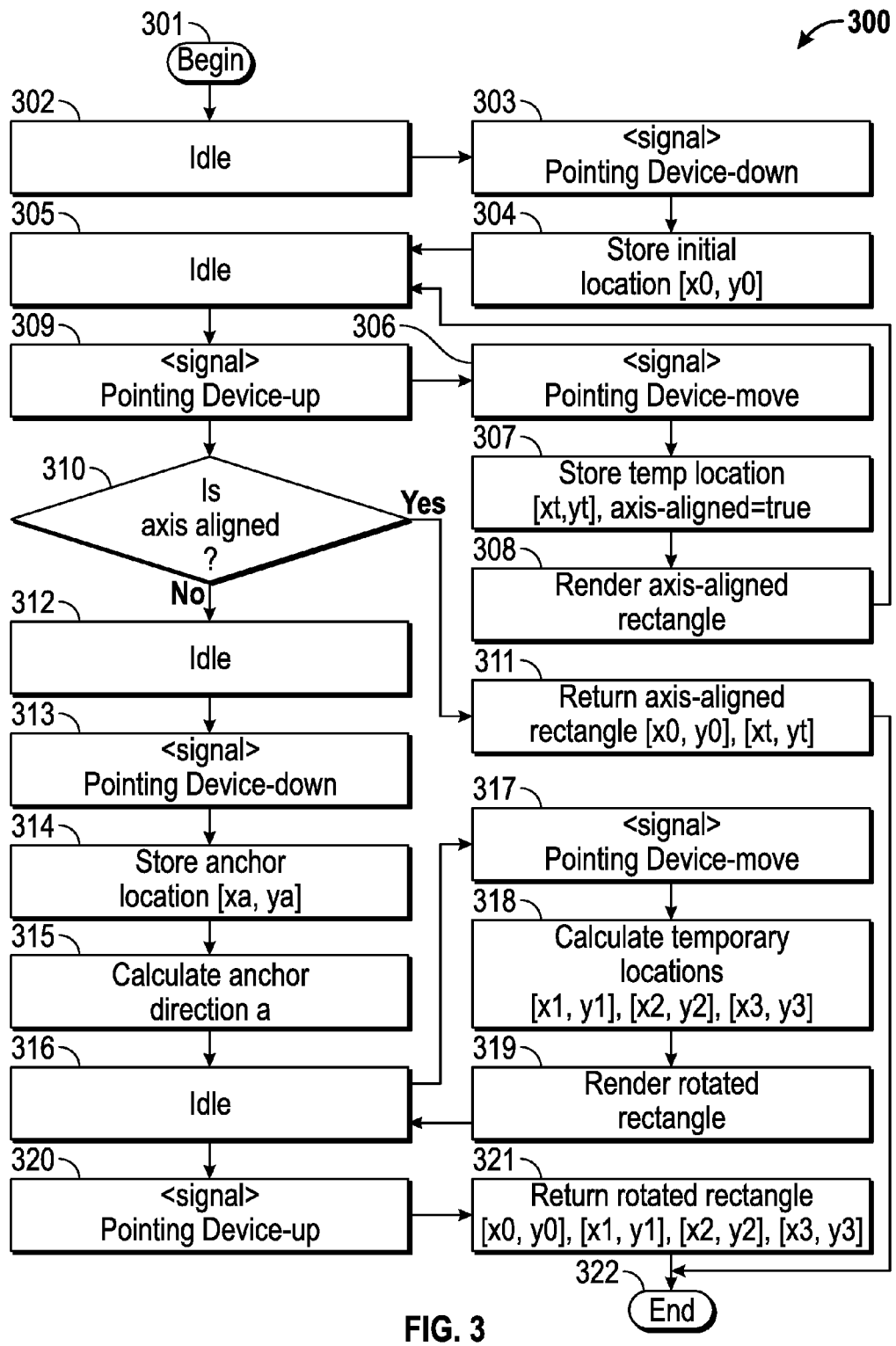
FIG. 3 illustrates an example process for drawing an aligned rectangle or rotated rectangle on an electronic device using the example client of FIG. 2.

FIG. 3 illustrates an example process 300 for drawing an aligned rectangle or rotated rectangle on an electronic device using the example client 110 of FIG. 2. While FIG. 3 is described with reference to FIG. 2, it should be noted that the process steps of FIG. 3 may be performed by other systems.

The process 300 begins by proceeding from beginning step 301 when the graphical user interface 224 is launched on the client 110 and a rectangle drawing mode is entered to step 302 when the graphical user interface 224 idly waits until a pointing device-down input is received from the input device 216. When a pointing device-down input is received in step 303, the initial location (x0, y0) for the pointing device-down input is stored (e.g., in memory 220), and the process 300 proceeds to step 305. In step 305, the graphical user interface 224 idly waits until either a pointing device-move input is received or a pointing-device up signal is received.

If a pointing device-move input is received in step 306, then a location (xt, yt) for the pointing device-move input is stored in step 307 and it is determined in step 308 that an axis-aligned rectangle (e.g., a rectangle aligned to the x-y axes of the graphical user interface) is to be rendered for display. The process 300 returns to step 305.

If a pointing-device up input is received in step 309, then the process 300 proceeds to decision step 310 in which it is decided whether an axis-aligned rectangle has been rendered for display (e.g., from step 308). If in decision step 310 it is determined that an axis-aligned rectangle has been rendered for display, then an axis-aligned rectangle is provided for display in step 311 based on the pair of coordinates (x0, yo) and (xt, yt) from steps 304 and 307, respectively, and the process 300 ends in step 322. If in decision step 310 it is determined that an axis-aligned rectangle has not been rendered for display, then the process 300 proceeds to step 312 in which the graphical user interface 224 idly waits until a pointing device-down input is received from the input device 216.

When a pointing device-down input is received in step 313, an anchor location (xa, ya) for the pointing device-down input is stored in step 314, and an anchor direction a is calculated in step 315. The process 300 proceeds to step 316, in which the graphical user interface 224 idly waits until either a pointing device-down input is received or a pointing-device up signal is received.

If a pointing device-move input is received (e.g., from the position (xa, ya) to the position (x2, y2)) in step 317, then the process 300 proceeds to step 318 in which temporary locations (x1, y1), (x2, y2), and (x3, y3) are calculated for a rotated rectangle. In step 319, the rotated rectangle with the four points (x0, y0), (x1, y1), (x2, y2), and (x3, y3) is rendered for display. Alternatively, if a pointing device-move input is received near the position (xa, ya) in step 317, then the process 300 proceeds to step 318 in which temporary locations (x1, y1), (xa, ya), and (x3, y3) are calculated for a rotated rectangle, which would be a rectangle having a height of zero (i.e., a line) being rendered for display in step 319.

If a pointing device-up input is received (e.g., at the position (x2, y2)) in step 320, then the process 300 proceeds to step 321 in which the rotated rectangle with the four points (x0, y0), (x1, y1), (x2, y2), and (x3, y3) is provided for display. The process 300 then ends in step 322.

FIG. 3 set forth an example process 300 for drawing an aligned rectangle or rotated rectangle on an electronic device using the example client 110 of FIG. 2. An example will now be described using the example process 300 of FIG. 3 for drawing a rotated rectangle on a client 110 including a mouse as an input device 216.

Figure 4A:
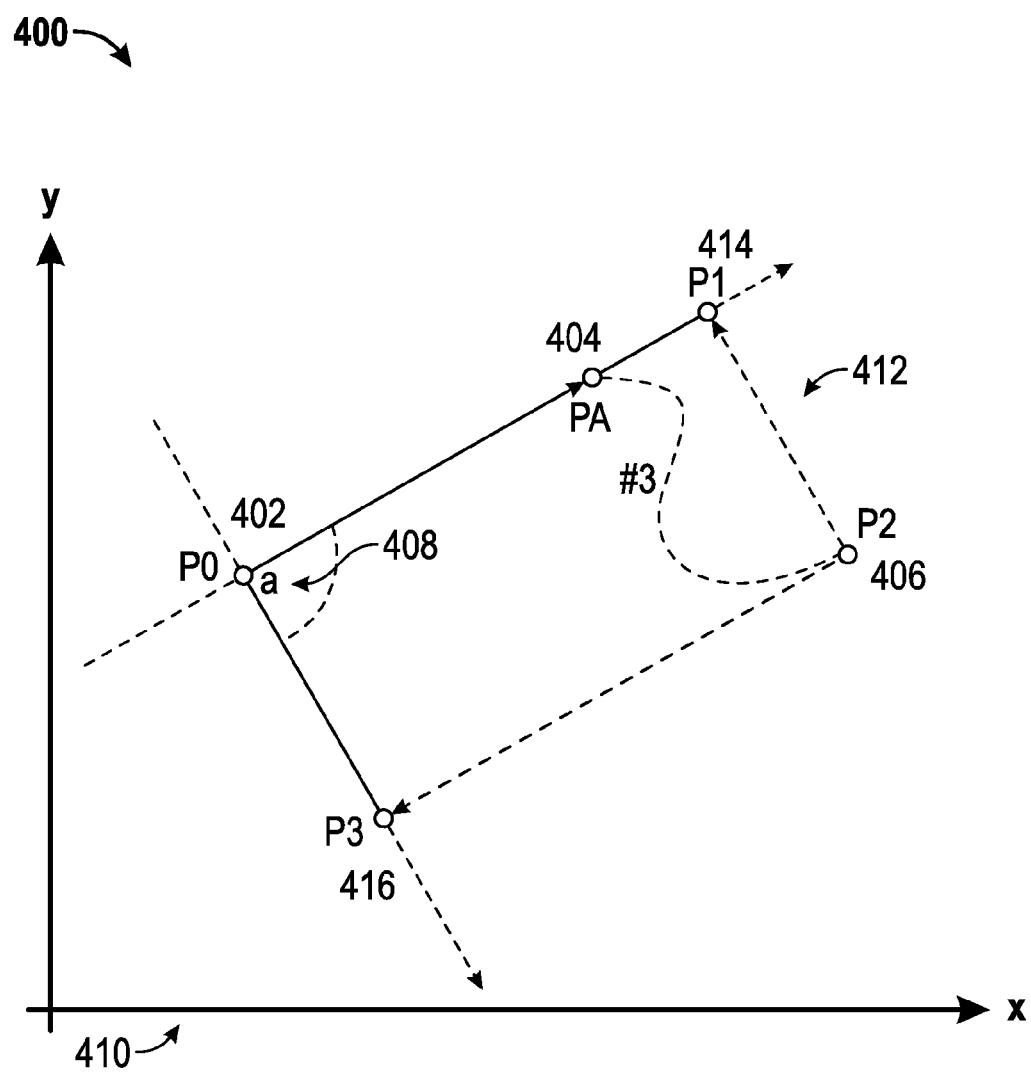
FIGS. 4A and 4B are example illustrations associated with the example process of FIG. 3.

The process 300 begins by proceeding from beginning step 301 when the graphical user interface 224 is launched on the client 110 and a rectangle drawing mode is entered to step 302 when the graphical user interface 224 idly waits until a mouse-down input is received from the input device 216. With reference to FIG. 4A, an illustration 400 of an example graphical user interface 224 for drawing a rectangle on the client 110, a mouse-down input (e.g., clicking a mouse button down) is received in step 303 for an initial location (P0) 402. The process 300 proceeds to step 305. In step 305, the graphical user interface 224 idly waits until either a mouse-move input is received or a pointing-device up signal is received.

A mouse-up input (e.g., release of a mouse click) is received in step 309 at or substantially near (P0) 402, and the process 300 proceeds to decision step 310 in which it is decided that an axis-aligned rectangle has not been rendered for display. The process 300 proceeds to step 312 in which the graphical user interface 224 idly waits until a mouse-down input is received from the input device 216. A mouse-down input (e.g., another clicking of the mouse button down) is received at location (PA) 404 in step 313, which is then set as an anchor location. An anchor direction a 408 is calculated in step 315. The process 300 proceeds to step 316, in which the graphical user interface 224 idly waits until either a mouse-down input is received or a pointing-device up signal is received.

A mouse-move input is received from the position (PA) 404 to the position (P2) 406 in step 317 with the mouse-down input still being applied (e.g., the mouse is dragged), and the process 300 proceeds to step 318 in which temporary locations (P0) 402, (P1) 414, (P2) 406, and (P3) 416 are calculated for a rotated rectangle. The mouse-move input may be to various other locations prior to the position (P2) 406, with the appropriate four corners of the rotated rectangle being calculated based on the other locations. In step 319, the rotated rectangle 412 with the four points (P0) 402, (P1) 414, (P2) 406, and (P3) 416 is rendered for display.

When a mouse-up input is received (e.g., at the position (P2) 406) in step 320, then the process 300 proceeds to step 321 in which a rotated rectangle 412 having the temporary locations (P0) 402, (P1) 414, (P2) 406, and (P3) 416 as its four points is provided for display. The rotated rectangle 412 can be used, for example, to outline the shape of a building on a map, as provided in the example illustration 420 of FIG. 4B.

Figure 4B:
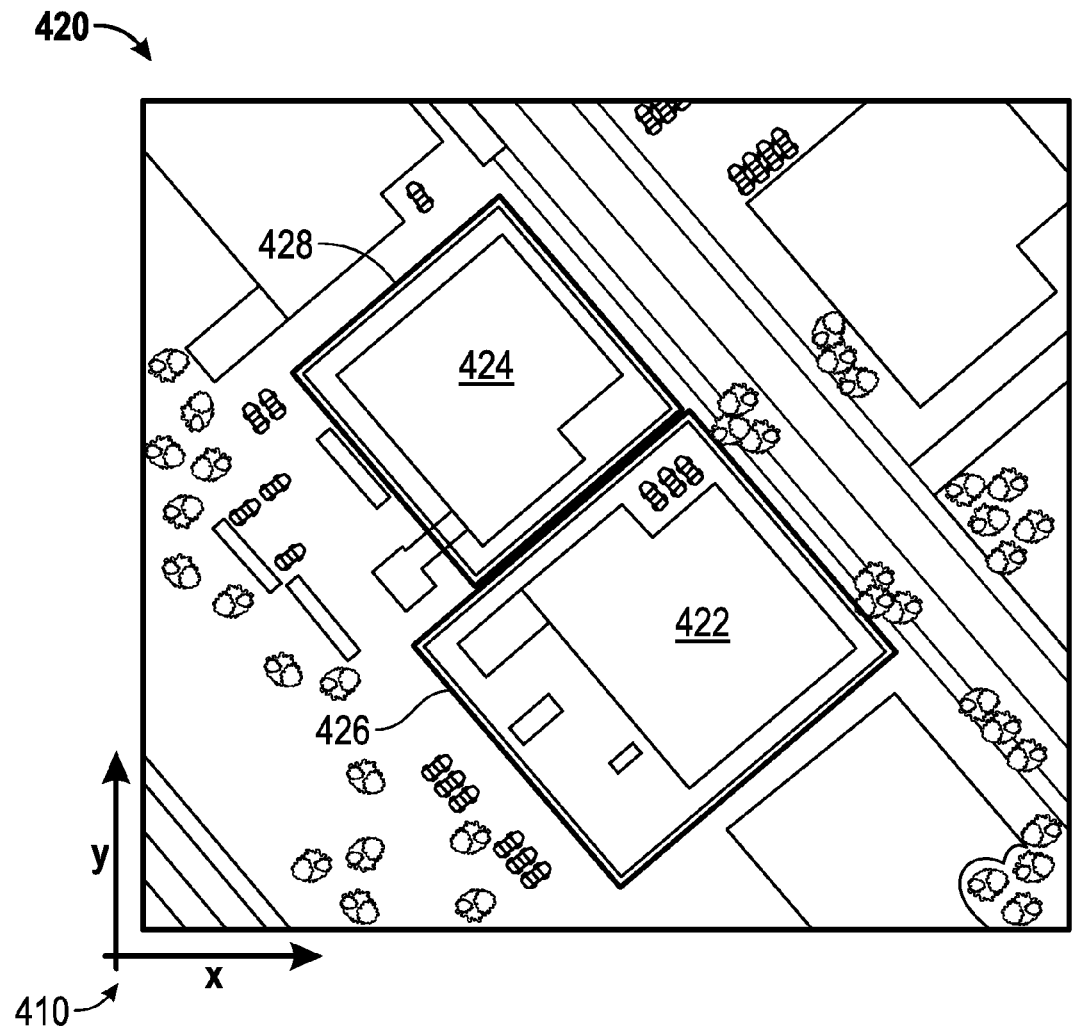

The graphical user interface of FIG. 4B is aligned along x-y axes 410. Buildings 422 and 424 in the graphical user interface are outlined with rotated rectangles 426 and 428, respectively, using the disclosed graphical user interface. The process 300 ends in step 322.

While various combinations of pointing device-down, pointing device-up, and pointing device-move inputs were provided as specific examples for implementing the disclosed graphical user interface for drawing an aligned rectangle or rotated rectangle on an electronic device, other combinations of pointing device inputs can be used. For example, instead of receiving a pointing device-down at a first location and a pointing device-up at a second location, a pointing device-down and pointing-device-up can be received at both the first and second location Likewise, pointing device-up and pointing device-down inputs can be switched. Various other combinations of pointing device inputs that permit the drawing of an aligned rectangle or rotated rectangle on an electronic device can also be used.

Figure 5:
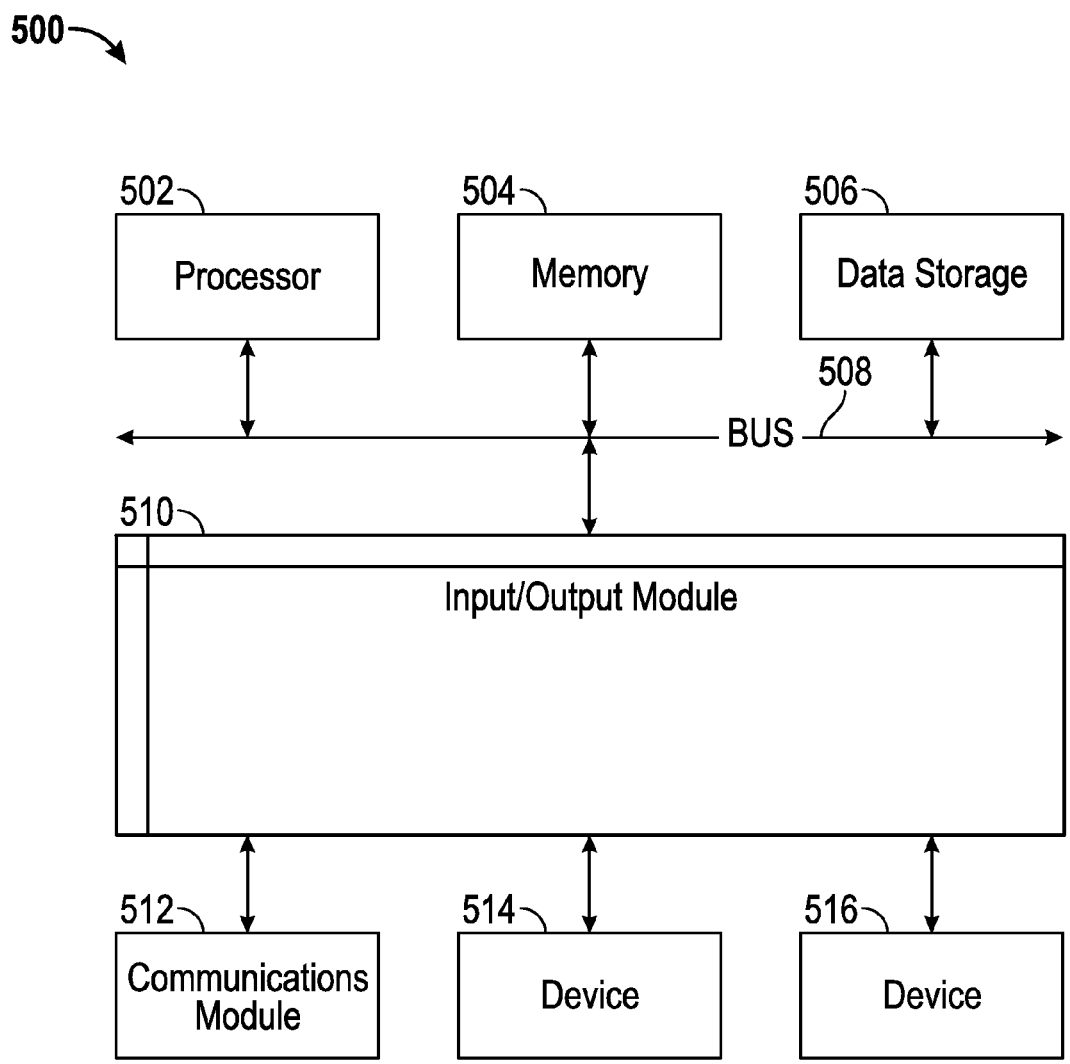
FIG. 5 is a block diagram illustrating an example computer system with which the client of FIG. 2 can be implemented.

FIG. 5 is a block diagram illustrating an example computer system 500 with which the client 110 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110) includes a bus 508 or other communication mechanism for communicating information, and a processor 502 (e.g., processor 212) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, with languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, the client 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for drawing an aligned rectangle or rotated rectangle on an electronic device, the method comprising:
   receiving, by one or more computing devices, a first user input at a first location of a movable indicator in a graphical user interface comprising an x-y axes;
   determining, by one or more computing devices, whether the movable indicator has moved from the first location prior to receiving a second user input;
   when the determination indicates that the indicator has moved from the first location to a second location prior to receiving the second user input, providing, for display, a rectangle based on coordinates of the first location and the second location and aligned to the x-y axes; and
   when the determination indicates that the indicator has remained at the first location when receiving the second user input and prior to the indicator moving from the first location to the second location, providing, for display, a first rotated rectangle, based on coordinates of the first location and a third location of the indicator, which is rotated about the x-y axes based on an angle calculated from the first location and the second location.

2. The computer-implemented method of claim 1, wherein providing the first rotated rectangle for display comprises receiving a third user input at the third location of the indicator.

3. The computer-implemented method of claim 2, further comprising:
   receiving a fourth user input at a fourth location of the indicator;
   providing, for display, a second rotated rectangle, based on coordinates of the first location and a fourth location of the indicator, which is rotated about the x-y axes based on the angle calculated from the first location and the second location.

4. The computer-implemented method of claim 3, wherein the second rotated rectangle is provided for display in place of the first rotated rectangle.

5. The computer-implemented method of claim 3, wherein each of the first rotated rectangle and the second rotated rectangle are provided for display overlaid onto existing content for display.

6. The computer-implemented method of claim 3, wherein the first user input and the third user input comprise pointing device-down actions, and the second user input and the fourth user input comprise pointing device-up actions.

7. The computer-implemented method of claim 6, wherein a device used for inputting the first user input, the second user input, the third user input, and the fourth user input is a mouse.

8. The computer-implemented method of claim 7, wherein a mouse-drag input is received from the mouse between the third user input and the fourth user input.

9. The computer-implemented method of claim 3, wherein each of the first user input, the second user input, the third user input, and the fourth user input comprise pointing device-up and pointing device-down actions.

10. The computer-implemented method of claim 3, wherein the first user input comprises a touch action, the second user input comprises a touch-release action, the third user input comprises a touch-and-hold action, and the fourth user input comprises a touch-release action.

11. A system for drawing an aligned rectangle or rotated rectangle on an electronic device, the system comprising:
a memory comprising instructions; and
a processor configured to execute the instructions to:
receive a first user input at a first location of a movable indicator in a graphical user interface comprising an x-y axes;
determine whether the movable indicator has moved from the first location prior to receiving a second user input;
when the determination indicates that the indicator has moved from the first location to a second location prior to receiving the second user input, provide, for display, a rectangle based on coordinates of the first location and the second location and aligned to the x-y axes; and
when the determination indicates that the indicator has remained at the first location when receiving the second user input and prior to the indicator moving from the first location to the second location, provide, for display, a first rotated rectangle, based on coordinates of the first location and a third location of the indicator,
wherein a third input is received at the third location, and
wherein the first rotated rectangle is rotated about the x-y axes based on an angle calculated from the first location and the second location.

12. The system of claim 11, wherein the processor is further configured to execute the instructions to:
receive a fourth user input at a fourth location of the indicator;
provide, for display, a second rotated rectangle, based on coordinates of the first location and a fourth location of the indicator, which is rotated about the x-y axes based on the angle calculated from the first location and the second location.

13. The system of claim 12, wherein the second rotated rectangle is provided for display in place of the first rotated rectangle.

14. The system of claim 12, wherein each of the first rotated rectangle and the second rotated rectangle are provided for display overlaid onto existing content for display.

15. The system of claim 12, wherein the first user input and the third user input comprise pointing device-down actions, and the second user input and the fourth user input comprise pointing device-up actions.

16. The system of claim 15, wherein a device used for inputting the first user input, the second user input, the third user input, and the fourth user input is a mouse, and wherein a mouse-drag input is received from the mouse between the third user input and the fourth user input.

17. The system of claim 12, wherein each of the first user input, the second user input, the third user input, and the fourth user input comprise pointing device-up and pointing device-down actions.

18. The system of claim 12, wherein the first user input comprises a touch action, the second user input comprises a touch-release action, the third user input comprises a touch-and-hold action, and the fourth user input comprises a touch-release action.

19. A non-transitory machine-readable storage medium comprising machine-readable instructions for causing a processor to execute a method for drawing an aligned rectangle or rotated rectangle on an electronic device, comprising:
receiving a first user input at a first location of a movable indicator in a graphical user interface comprising an x-y axes;
determining whether the movable indicator has moved from the first location prior to receiving a second user input;
when the determination indicates that the indicator has moved from the first location to a second location prior to receiving the second user input, providing, for display, a rectangle based on coordinates of the first location and the second location and aligned to the x-y axes; and
when the determination indicates that the indicator has remained at the first location when receiving the second user input, then:
providing, for display, a first rotated rectangle, based on coordinates of the first location and a third location of the indicator, which is rotated about the x-y axes based on an angle calculated from the first location and the second location;
receiving a fourth user input at a fourth location of the indicator;
wherein a third input is received at the third location; and
providing, for display, a second rotated rectangle, based on coordinates of the first location and a fourth location of the indicator, which is rotated about the x-y axes based on the angle calculated from the first location and second location,
wherein the first user input and the third user input comprise pointing device-down actions, and the second user input and the fourth user input comprise pointing device-up actions.

20. The machine-readable storage medium of claim 19, wherein the second rotated rectangle is provided for display in place of the first rotated rectangle.

* * * * *